United States Patent
Hsu et al.

(10) Patent No.: US 8,724,680 B2
(45) Date of Patent: May 13, 2014

(54) TRANSCEIVER WITHOUT USING A CRYSTAL OSCILLATOR

(75) Inventors: Ming-Feng Hsu, New Taipei (TW); Kai-Yin Liu, Kaohsiung (TW); Tzu-Han Hsu, Kaohsiung (TW); Yuan-Jih Chu, Hsinchu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 45 days.

(21) Appl. No.: 13/609,275

(22) Filed: Sep. 11, 2012

(65) Prior Publication Data
US 2013/0128933 A1  May 23, 2013

(30) Foreign Application Priority Data
Nov. 21, 2011  (TW) .............................. 100142513 A

(51) Int. Cl.
*H04B 1/38*  (2006.01)
*H04L 5/16*  (2006.01)

(52) U.S. Cl.
USPC ............ 375/219; 375/371; 375/373; 375/375

(58) Field of Classification Search
USPC ......................................... 375/219, 371–376
See application file for complete search history.

(56) References Cited

U.S. PATENT DOCUMENTS

| 8,049,569 | B1 | 11/2011 | Wright |
| 2006/0290394 | A1* | 12/2006 | Tseng ............................ 327/158 |
| 2007/0001661 | A1* | 1/2007 | Loke et al. .................. 324/76.53 |
| 2009/0168943 | A1 | 7/2009 | Chao |
| 2009/0296869 | A1 | 12/2009 | Chao |

* cited by examiner

*Primary Examiner* — Curtis Odom
(74) *Attorney, Agent, or Firm* — Winston Hsu; Scott Margo

(57) ABSTRACT

A transceiver includes a transceiver and a clock generation unit. The clock generation unit includes a clock generator, a multiplexer, and a frequency difference detector. The transceiver exchanges data with a link partner according to a first clock generated by a phase-locked loop. The clock generator is used for generating and outputting a second clock. The multiplexer is used for receiving a calibration clock or a receiver clock of the link partner, and outputting the calibration clock or the receiver clock of the link partner. The frequency difference detector is used for generating a difference signal according to a difference between the calibration clock and the second clock, or a difference between the receiver clock of the link partner and the second clock. The clock generator adjusts the shift of the second clock according to the difference signal. The phase-locked loop generates the first clock according to the second clock.

12 Claims, 3 Drawing Sheets

TRANSCEIVER WITHOUT USING A CRYSTAL OSCILLATOR

BACKGROUND OF THE INVENTION

1. Field of the Invention

The present invention relates to a transceiver applied to an Ethernet system, and particularly to a transceiver without using a crystal oscillator applied to an Ethernet system.

2. Description of the Prior Art

An Ethernet system is a widely used network, which can allow devices (a host and a link partner) at two opposite terminals of the Ethernet system to transmit/receive data simultaneously and to automatically select proper transmitting/receiving speeds. In the Ethernet system, the host and the link partner must utilize a transmission speed based on a specification of the Ethernet system to transmit/receive data. Taking a 100 MHz transmission speed as an example, speed of Multilevel Transmission 3 (MLT3) transmitted on a media document interface (MDI) line needs to be 125 MHz ±100 ppm. If the frequency of the host and the frequency of the link partner is too different, a receiver of the host may not identify data from the link partner, resulting in a connection not being established between the host and the link partner, or in some cases, packets transmitted between the host and the link partner may be wrong.

To satisfy the 125 MHz ±100 ppm requirement, the Ethernet system usually provides an accurate external reference clock to a phase-locked loop of the receiver of the host, and then the phase-locked loop generates a clock that fits the requirement of the Ethernet system. Generally speaking, the Ethernet system utilizes crystal oscillator devices to generate the accurate external reference clock to the receiver of the host. However, crystal oscillator devices are costly and occupy large areas. Therefore, to the way of designing a receiver without using an external reference clock becomes an important issue for a designer.

SUMMARY OF THE INVENTION

An embodiment provides a transceiver without using a crystal oscillator. The transceiver includes a transceiving unit and a clock generation unit, where the clock generation unit includes a clock generator, a multiplexer, and a frequency difference detector. The transceiving unit includes a phase-locked loop, where the phase-locked loop is used for generating a first clock, and the transceiving unit exchanges data with a link partner according to the first clock. The clock generator is used for generating and outputting a second clock to the transceiving unit. The multiplexer includes a first input terminal for receiving a receiver clock of the link partner, and an output terminal for outputting the calibration clock or the receiver clock of the link partner. The frequency difference detector is coupled to the clock generator and the output terminal of the multiplexer for generating a difference signal according to a difference between the calibration clock and the second clock within a predetermined period, or a difference between the receiver clock of the link partner and the second clock within the predetermined period. The phase-locked loop generates the first clock according to the second clock, and the clock generator adjusts shift of the second clock according to the difference signal.

The present invention provides a transceiver without using a crystal oscillator. The transceiver utilizes a clock generation unit to generate a second clock to a phase-locked loop of a transceiving unit. Then, the phase-locked loop can generate a first clock that fits a requirement of an Ethernet system by referencing the second clock. Therefore, compared to the prior art, the present invention can generate the accurate second clock to the phase-locked loop of the transceiving unit without using crystal oscillator devices.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
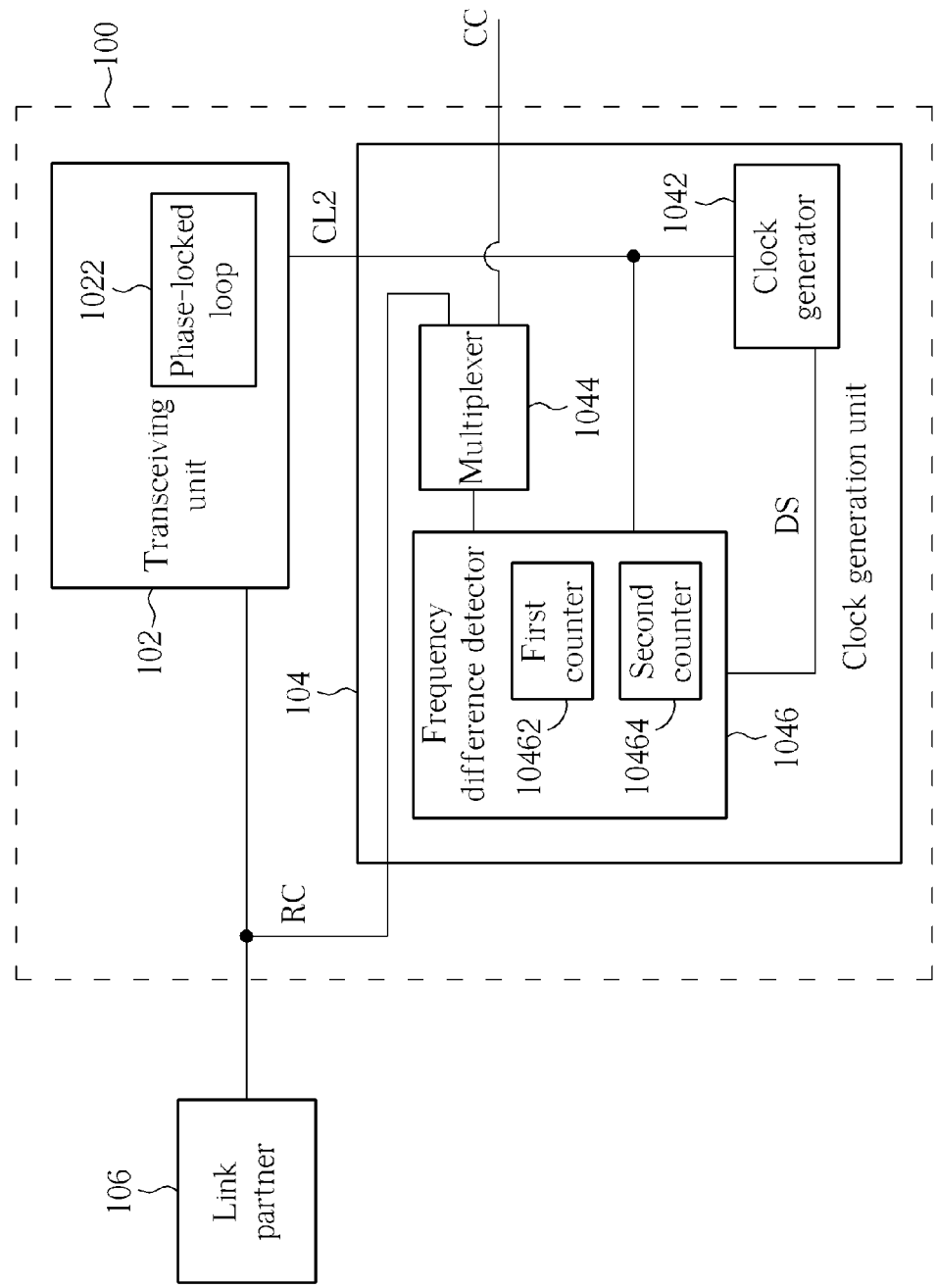
FIG. 1 is a diagram illustrating a transceiver without using a crystal oscillator according to an embodiment.

Please refer to FIG. 1. FIG. 1 is a diagram illustrating an embodiment of a transceiver 100 without a crystal oscillator. The transceiver 100 includes a transceiving unit 102 and a clock generation unit 104, where the clock generation unit 104 includes a clock generator 1042, a multiplexer 1044, and a frequency difference detector 1046. The transceiving unit 102 of the embodiment includes a phase-locked loop 1022 for generating a first clock, and the transceiving unit 102 exchanges data with a link partner 106 according to the first clock. The clock generator 1042 is used for generating and outputting a second clock CL2 to the transceiving unit 102, where the clock generator 1042 can be a ring oscillator, a voltage- or current-controlled oscillator (e.g. a resistor-capacitor oscillator or an inductor-capacitor oscillator), a delay time oscillator, or a multivibrator. The multiplexer 1044 of the embodiment has a first input terminal for receiving a calibration clock CC, a second input terminal for receiving a receiver clock RC of the link partner 106, and an output terminal for outputting the calibration clock CC or the receiver clock RC of the link partner 106. The frequency difference detector 1046 of the embodiment is coupled to the clock generator 1042 and the output terminal of the multiplexer 1044 for generating a difference signal DS according to a difference between the calibration clock CC and the second clock CL2 within a predetermined period T, or a difference between the second clock CL2 and the receiver clock RC of the link partner 106 within the predetermined period T. The frequency difference detector 1046 can be a digital circuit or an analog circuit. In addition, the phase-locked loop 1022 generates the first clock according to the second clock CL2.

As shown in FIG. 1, the frequency difference detector 1046 includes a first counter 10462 and a second counter 10464. The first counter 10462 is used for counting a first clock number generated by the calibration clock CC within the predetermined period T, or a second clock number generated by the receiver clock RC of the link partner 106 within the predetermined period T; and, the second counter 10464 is used for counting a third clock number generated by the second clock CL2 within the predetermined period T. Therefore, the frequency difference detector 1046 can generate the difference signal DS according to a difference between the first clock number (corresponding to the calibration clock CC) and the third clock number (corresponding to the second clock CL2) within the predetermined period T, or according to a difference between the second clock number (corresponding to the receiver clock RC of the link partner 106) and the third clock number (corresponding to the second clock CL2) within the predetermined period T. Then, the clock generator 1042 can adjust drift of the second clock CL2 generated by a process, temperature, a voltage and/or other factors according to the difference signal DS.

As shown in FIG. 1, while the transceiver 100 is not yet shipped (that is, the transceiver 100 is not linked to the link partner 106), the multiplexer 1044 outputs the calibration clock CC. Therefore, the first counter 10462 counts the first clock number generated by the calibration clock CC within the predetermined period T, and the second counter 10464 counts the third clock number generated by the second clock CL2 within the predetermined period T. Then, the frequency difference detector 1046 can generate the difference signal DS according to the difference between the first clock number (corresponding to the calibration clock CC) and the third clock number (corresponding to the second clock CL2) within the predetermined period T. Because the clock generator 1042 and the frequency difference detector 1046 can form a negative feedback loop, the second clock CL2 can approach the calibration clock CC. Thus, the clock generator 1042 can adjust drift of the second clock CL2 generated by a process, temperature, a voltage and/or other factors according to the difference signal DS.

As shown in FIG. 1, after the transceiver 100 is shipped and the transceiver 100 links with the link partner 106, the multiplexer 1044 outputs the receiver clock RC of the link partner 106. Therefore, the first counter 10462 counts the second clock number generated by the receiver clock RC of the link partner 106 within the predetermined period T, and the second counter 10464 counts the third clock number generated by the second clock CL2 within the predetermined period T. Then, the frequency difference detector 1046 can generate the difference signal DS according to the difference between the second clock number (corresponding to the receiver clock RC of the link partner 106) and the third clock number (corresponding to the second clock CL2) within the predetermined period T. Because the clock generator 1042 and the frequency difference detector 1046 can form the negative feedback loop, the second clock CL2 can approach the receiver clock RC of the link partner 106. Thus, the clock generator 1042 can adjust drift of the second clock CL2 generated by a process, temperature, a voltage and/or other factors according to the difference signal DS.

Figure 2:
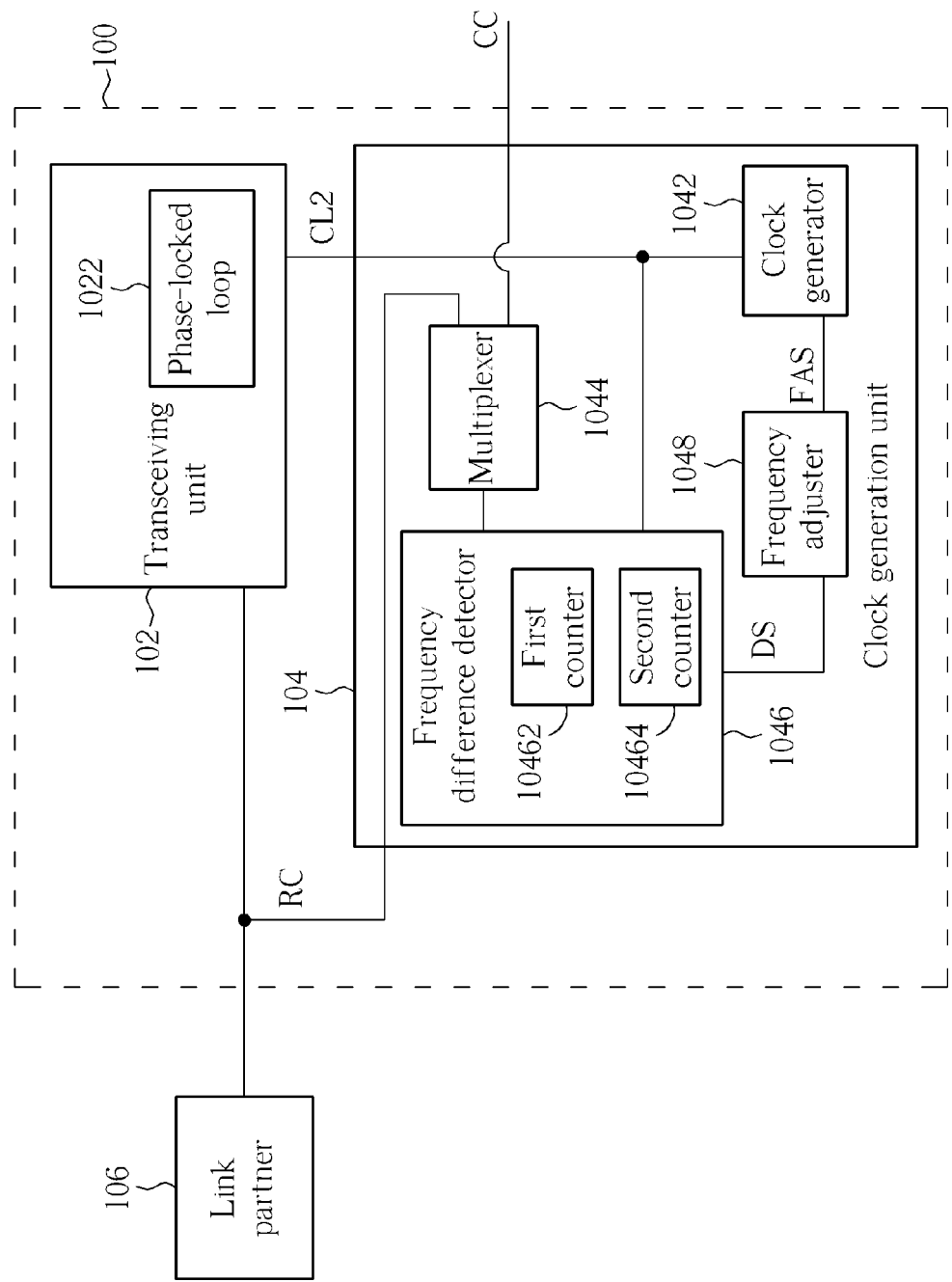
FIG. 2 is a diagram illustrating a transceiver without using a crystal oscillator according to another embodiment.

Please refer to FIG. 2. FIG. 2 is a diagram illustrating another embodiment of a transceiver 200 without a crystal oscillator. A difference between the transceivers 200 and 100 is that the clock generation unit 104 of the transceiver 200 further includes a frequency adjuster 1048, where the frequency adjuster 1048 can be an analog circuit. The frequency adjuster 1048 is coupled between the frequency difference detector 1046 and the clock generator 1042 for generating a frequency adjustment signal FAS to the clock generator 1042 according to the difference signal DS. Therefore, the clock generator 1042 can adjust drift of the second clock CL2 generated by a process, temperature, a voltage and/or other factors according to the frequency adjustment signal FAS. In addition, subsequent operational principles of the transceiver 200 are the same as those of the transceiver 100, so further description thereof is omitted for simplicity.

Figure 3:
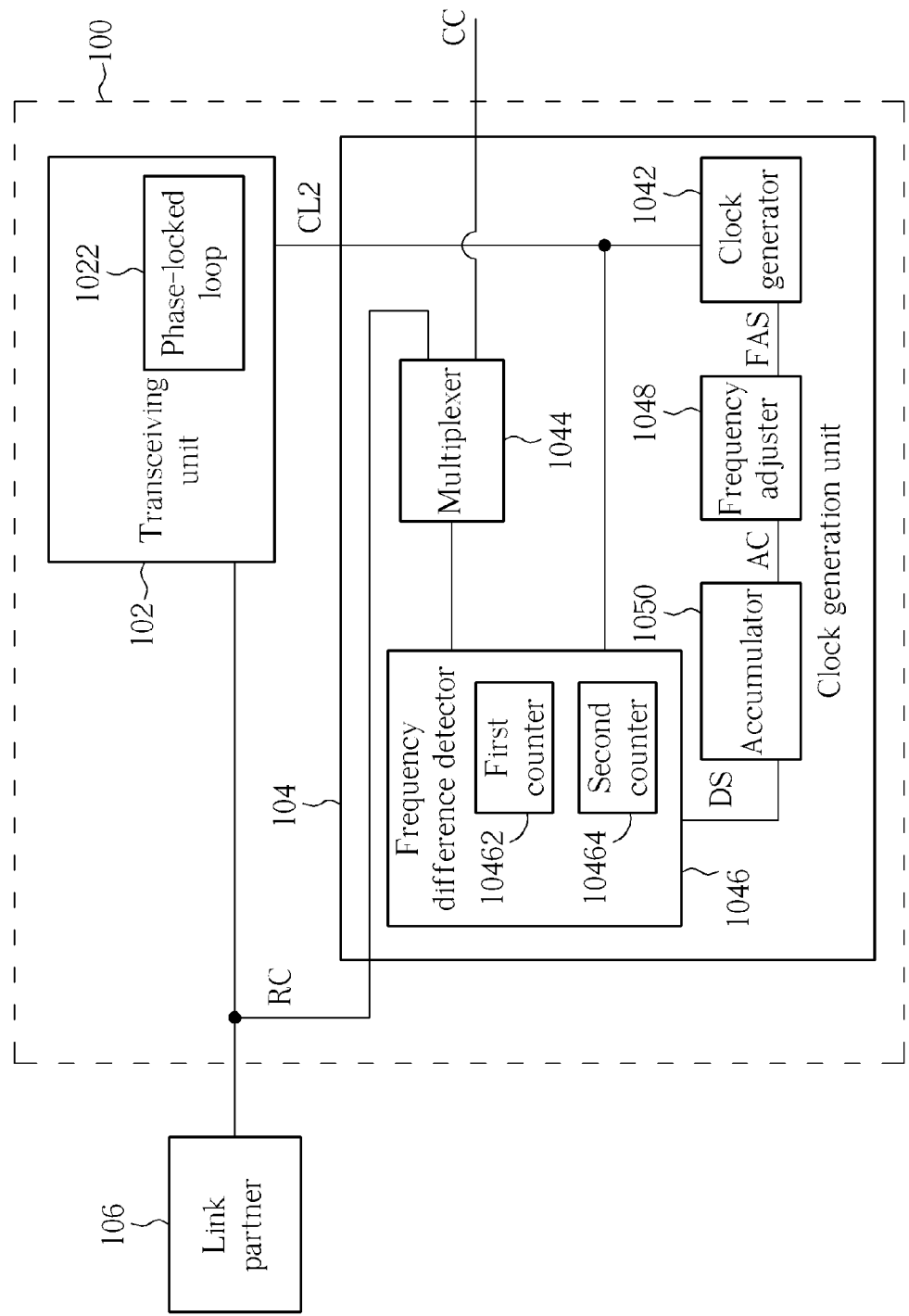
FIG. 3 is a diagram illustrating a transceiver without using a crystal oscillator according to another embodiment.

Please refer to FIG. 3. FIG. 3 is a diagram illustrating another embodiment of a transceiver 300 without a crystal oscillator. A difference between the transceivers 300 and 100 is that the clock generation unit 104 of the transceiver 300 further includes a frequency adjuster 1048 and an accumulator 1050, where the frequency adjuster 1048 is an analog circuit. The accumulator 1050 is coupled to the frequency difference detector 1046 for accumulating a difference signal DS within a first predetermined period to generate an accumulation signal AC. That is, the accumulator 1050 acts as a low-pass filter for accumulating the difference signal DS within the first predetermined period to filter noise of the difference signal DS within the first predetermined period to generate the accumulation signal AC. The frequency adjuster 1048 is coupled between the accumulator 1050 and the clock generator 1042 for generating a frequency adjustment signal FAS to the clock generator 1042 according to the accumulation signal AC. Therefore, the clock generator 1042 can adjust drift of the second clock CL2 generated by a process, temperature, a voltage and/or other factors according to the frequency adjustment signal FAS. In addition, subsequent operational principles of the transceiver 300 are the same as those of the transceiver 100, so further description thereof is omitted for simplicity.

To sum up, the transceiver that does not use a crystal oscillator utilizes the clock generation unit to generate the second clock to the phase-locked loop of the transceiving unit. Then, the phase-locked loop can generate a first clock that fits a requirement of an Ethernet system by referencing the second clock. Therefore, compared to the prior art, the present invention can generate an accurate second clock to the phase-locked loop of the transceiving unit without using crystal oscillator devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transceiver, comprising:
    a transceiving unit comprising a phase-locked loop, wherein the phase-locked loop is used for generating a first clock, and the transceiving unit exchanges data with a link partner according to the first clock; and
    a clock generation unit, comprising:
        a clock generator for generating and outputting a second clock to the transceiving unit;
        a multiplexer comprising a first input terminal for receiving a calibration clock, a second input terminal for receiving a receiver clock of the link partner, and an output terminal for outputting the calibration clock or the receiver clock of the link partner; and
        a frequency difference detector coupled to the clock generator and the output terminal of the multiplexer for generating a difference signal according to a difference between the calibration clock and the second clock within a predetermined period, or a difference between the receiver clock of the link partner and the second clock within the predetermined period;
    wherein the transceiver does not include a crystal oscillator.

2. The transceiver of claim 1, wherein and the phase-locked loop generates the first clock according to the second clock, and the clock generator adjusts the shift of the second clock according to the difference signal.

3. The transceiver of claim 1, wherein the clock generation unit further comprises:
    a frequency adjuster coupled between the frequency difference detector and the clock generator for generating a frequency adjustment signal to the clock generator according to the difference signal;
    wherein the clock generator adjusts the shift of the second clock according to the frequency adjustment signal.

4. The transceiver of claim 3, wherein the frequency adjuster is an analog circuit.

5. The transceiver of claim 1, wherein the clock generation unit further comprises:
- an accumulator coupled to the frequency difference detector for accumulating the difference signal to generate an accumulation signal; and
- a frequency adjuster coupled between the accumulator and the clock generator for generating a frequency adjustment signal to the clock generator according to the accumulation signal;
- wherein the clock generator adjusts the shift of the second clock according to the frequency adjustment signal.

6. The transceiver of claim 5, wherein the frequency adjuster is an analog circuit.

7. The transceiver of claim 1, wherein the frequency difference detector is an analog circuit, a digital circuit, or an analog-digital hybrid circuit.

8. The transceiver of claim 1, wherein the clock generator is a ring oscillator, a voltage-controlled oscillator, a current-controlled oscillator, a delay time oscillator, or a multivibrator.

9. The transceiver of claim 8, wherein the voltage-controlled oscillator is a resistor-capacitor oscillator or an inductor-capacitor oscillator.

10. The transceiver of claim 1, wherein the multiplexer outputs the calibration clock when the transceiver does not link with the link partner.

11. The transceiver of claim 1, wherein the multiplexer outputs the receiver clock of the link partner when the transceiver links with the link partner.

12. The transceiver of claim 1, wherein the frequency difference detector comprises:
- a first counter for counting a first clock number generated by the calibration clock within the predetermined period, or a second clock number generated by the receiver clock of the link partner within the predetermined period; and
- a second counter for counting a third clock number generated by the second clock within the predetermined period;
- wherein the frequency difference detector generates the difference signal according to a difference between the first clock number and the third clock number within the predetermined period, or according to a difference between the second clock number and the third clock number within the predetermined period.

* * * * *